Aug. 18, 1942.                M. F. SNELLINGS                2,293,476
                                ROASTING PAN
                              Filed Feb. 5, 1941
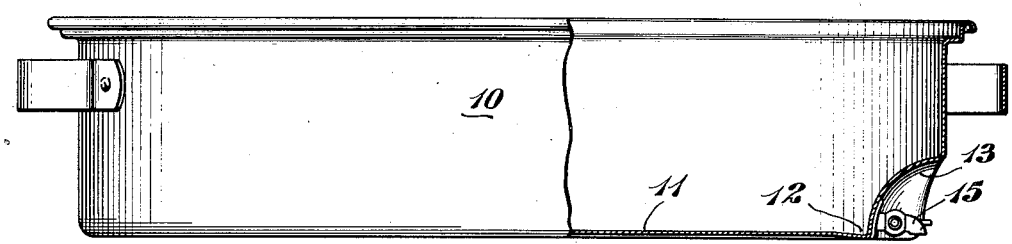
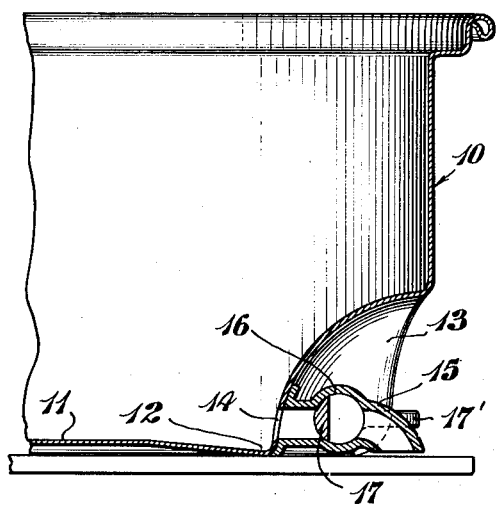 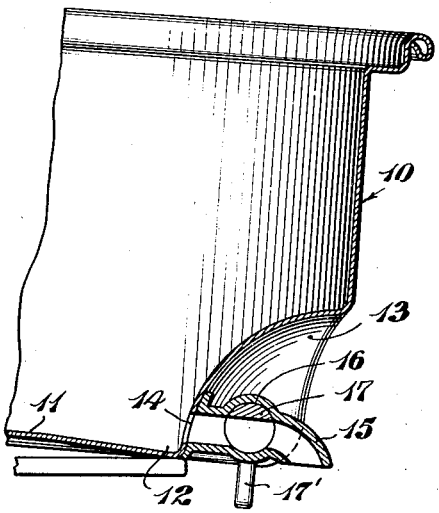
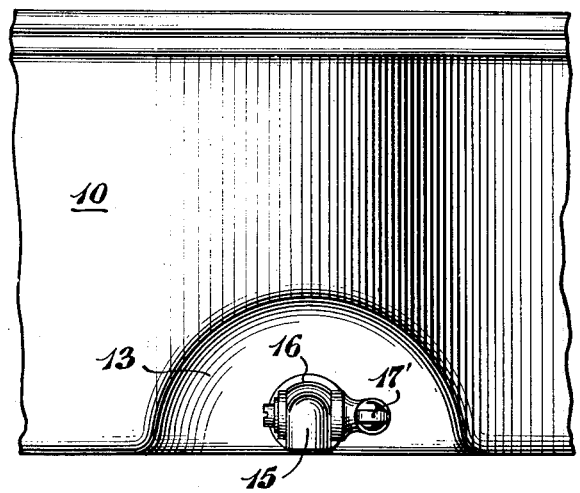
INVENTOR.
M. F. Snellings
BY Patented Aug. 18, 1942

2,293,476

UNITED STATES PATENT OFFICE 2,293,476

ROASTING PAN

Milton F. Snellings, Washington, D. C.

Application February 5, 1941, Serial No. 377,566

1 Claim. (Cl. 53—6)

This invention relates to roasting vessels or pans used for roasting or cooking meats and other food products.

Baking pans or vessels as heretofore constructed rendered the basting operation clumsy and difficult and also hampered efficient cooking or roasting of the meat. This was due primarily to the fact that the vessel or pan had to be withdrawn from the oven and the meat or the article of food basted by dipping a spoon or ladle down into the pan, sometimes necessitating moving of the meat or shifting it from its original position and exposing the vessel and meat to the air, and otherwise hindering proper roasting of the meat.

The object of the present invention is to provide a cooking or roasting pan or vessel provided with means which permits the basting operation to be carried out easily and quickly, such means adding but little to the cost of the vessel and being so constructed as to not interfere with the proper disposition of the vessel in the oven or upon its supporting base.

The foregoing and other objects and advantages will become apparent in view of the following description taken in conjunction with the drawing, wherein:

Fig. 1 is a view in side elevation and partially broken away of a roasting pan or vessel constructed in accordance with the invention;

Fig. 2 is an enlarged section of the right-hand end of the pan of Fig. 1;

Fig. 3 is a view similar to Fig. 2 but showing the pan in the basting position; and Fig. 4 is a fragmentary end view of the pan or vessel.

Referring to the drawing in detail, the roasting pan or vessel is generally indicated at 10 and may be given any suitable shape, that adopted in the drawing being a conventional shape commonly used. The bottom 11 of the pan is preferably slightly raised in the central portion, providing a drain or trough 12 around the bottom edge which slopes toward the one end of the pan.

A depression or recess 13 is formed in the end wall of the pan, and at the base of this depression the said wall is formed with a drain opening 14 to which a faucet 15 is secured, as by welding. The faucet 15 is formed with an enlargement 16 providing a valve housing, and therein is mounted a valve member 17 having a handle 17'. This valve is preferably of the rotating ball type and made of heat resistant material with a low coefficient of expansion.

During the basting operation, whenever it is desired to baste the meat, the oven door may be opened and the pan withdrawn just sufficiently to permit the end of the spigot 15 to clear the support on which the pan rests. In some instances, it may not be necessary to pull the pan outwardly any distance from the oven, since the end of the spigot may clear the bottom of the oven or shelf. The valve 17 is then turned from the closed position shown in Fig. 2 to the open position shown in Fig. 3 and a ladle, cup or other suitable container used to catch the juice or broth draining from the pan, whereupon the basting may be carried out in the usual manner. Fig. 3 shows the vessel slightly tilted to insure complete drainage of the meat broth, but ordinarily such tilting would not be necessary due to the fact that the bottom wall of the pan is formed with a drain.

From the foregoing it will be seen that the basting operation may be carried out quickly and easily without disturbing the meat and without necessitating holding the oven door open for any material length of time. Due to the manner in which the faucet and valve unit is mounted in the end wall of the pan, the said unit interferes in no way with the normal use of the pan.

It will be understood that no attempt is made herein to indicate all of the advantages of the improved roasting vessel, and further, that certain limited changes in construction and design may be adopted without departing from the spirit or scope of the invention as defined by the appended claim.

What is claimed is:

A roasting vessel or pan, an external end wall thereof adjacent the base of the pan formed with a pronounced depression defining a recess, the bottom of the pan being higher in the center than the surrounding marginal area thereof providing a drain which slopes downwardly toward the depressed end of the pan, the end wall of the pan at the base of said recess being formed with an outlet opening for fluids accumulating in said drain, a faucet spout rigidly connected to the end wall around said opening and projecting outwardly with the tip thereof terminating within the confines of said recess and substantially level with the bottom of the pan, and a valve for controlling said faucet spout.

MILTON F. SNELLINGS.